United States Patent
Nakata et al.

(10) Patent No.: US 10,755,675 B2
(45) Date of Patent: Aug. 25, 2020

(54) IMAGE PROCESSING SYSTEM, IMAGE PROCESSING METHOD, AND COMPUTER PROGRAM

(71) Applicant: SONY INTERACTIVE ENTERTAINMENT INC., Tokyo (JP)

(72) Inventors: Daisuke Nakata, Kanagawa (JP); Takahiro Nakayama, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/328,798

(22) PCT Filed: Sep. 1, 2017

(86) PCT No.: PCT/JP2017/031537
§ 371 (c)(1),
(2) Date: Feb. 27, 2019

(87) PCT Pub. No.: WO2018/047730
PCT Pub. Date: Mar. 15, 2018

(65) Prior Publication Data
US 2019/0213975 A1   Jul. 11, 2019

(30) Foreign Application Priority Data
Sep. 8, 2016 (JP) ................ 2016-175811

(51) Int. Cl.
*G09G 5/377* (2006.01)
*G09G 5/00* (2006.01)
(Continued)

(52) U.S. Cl.
CPC ......... *G09G 5/377* (2013.01); *G02B 27/0101* (2013.01); *G02B 27/0172* (2013.01);
(Continued)

(58) Field of Classification Search
None
See application file for complete search history.

(56) References Cited

U.S. PATENT DOCUMENTS

2006/0119617 A1* 6/2006 Toyooka ............... G09G 3/2092
 345/619
2012/0134415 A1* 5/2012 Lin ........................ H04N 19/61
 375/240.16
(Continued)

FOREIGN PATENT DOCUMENTS

| JP | 2003-153128 A | 5/2003 |
| JP | 2013-246368 A | 12/2013 |
| WO | 2014/197226 A1 | 12/2014 |

OTHER PUBLICATIONS

International Preliminary Report on Patentability dated Mar. 12, 2019, from International Application No. PCT/JP2017/031537, 11 sheets.
(Continued)

*Primary Examiner* — Talha M Nawaz
(74) *Attorney, Agent, or Firm* — Katten Muchin Rosenman LLP

(57) ABSTRACT

A plurality of drawing nodes 34 draw, in parallel, a plurality of individual images to be displayed in a plurality of individual regions obtained by dividing a frame display region. A display control node 36 generates a synthetic image obtained by synthesizing together the plurality of individual images drawn by the plurality of drawing nodes 34 and causes the synthetic image to be displayed on a display device 38. In the case where the individual image of at least one individual region is delayed at a frame processing timing, the display control node 36 generates a synthetic image as an individual image of that individual region by applying the individual image of the previous frame.

8 Claims, 10 Drawing Sheets

(51) Int. Cl.
*G09G 5/36* (2006.01)
*G06F 3/147* (2006.01)
*G06T 15/00* (2011.01)
*G09G 5/14* (2006.01)
*G06T 7/00* (2017.01)
*G02B 27/01* (2006.01)

(52) U.S. Cl.
CPC ............... *G06F 3/147* (2013.01); *G06T 7/97* (2017.01); *G06T 15/005* (2013.01); *G09G 5/00* (2013.01); *G09G 5/14* (2013.01); *G09G 5/36* (2013.01); *G02B 2027/0123* (2013.01); *G09G 2340/10* (2013.01); *G09G 2370/022* (2013.01)

(56) References Cited

U.S. PATENT DOCUMENTS

| | | | | |
|---|---|---|---|---|
| 2014/0153647 | A1* | 6/2014 | Nakamura | H04N 19/52 375/240.14 |
| 2014/0192883 | A1* | 7/2014 | Seregin | H04N 19/52 375/240.16 |
| 2014/0361977 | A1 | 12/2014 | Stafford et al. | |
| 2015/0098019 | A1 | 4/2015 | Takahashi | |
| 2015/0229847 | A1* | 8/2015 | Aoki | H04N 5/23293 348/333.05 |
| 2016/0028940 | A1* | 1/2016 | Izawa | G02B 7/365 348/349 |
| 2017/0094163 | A1* | 3/2017 | Ohba | G06K 9/00 |
| 2017/0150167 | A1* | 5/2017 | Nakamura | H04N 19/52 |
| 2017/0150168 | A1* | 5/2017 | Nakamura | H04N 19/52 |
| 2018/0081525 | A1* | 3/2018 | Wang | G06F 3/04883 |

OTHER PUBLICATIONS

International Search Report and Written Opinion dated Oct. 31, 2017, from International Application No. PCT/JP2017/031537, 8 sheets.

Naoki Hashimoto et al., "PC Cluster o Mochiita Heiretsu Rendering Shuho no Kento", Dai 62 Kai (Heisei 13 Nen Zenki) Zenkoku Taikai Koen Ronbunshu (4) Interface Computer to Ningen Shakai, Mar. 13, 2001 (Mar. 13, 2001), pp. (4-173) to (4-174).

* cited by examiner

F I G . 7
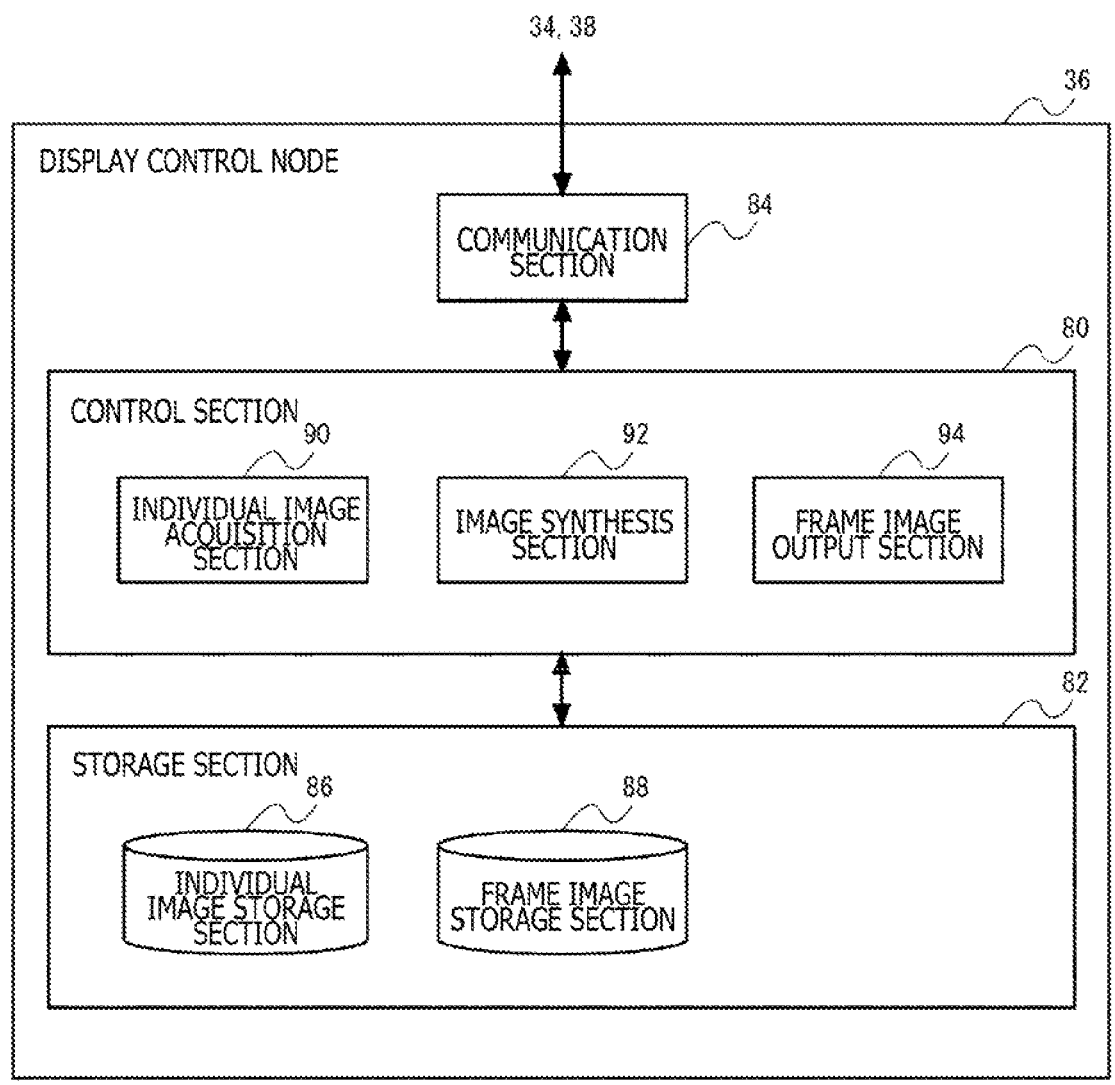

(a)

(b)

(c)

(d)

(e)

(f)

IMAGE PROCESSING SYSTEM, IMAGE PROCESSING METHOD, AND COMPUTER PROGRAM

TECHNICAL FIELD

The present invention relates to an image processing technology.

BACKGROUND ART

A head-mounted display (hereinafter also referred to as an "HMD") is worn on a user's head to provide a world of virtual reality (VR) to the user. Recent years have seen the emergence of applications that allow the user to play a game while at the same time watching s screen displayed on the HMD. In an existing stationary display such as television receiver, a user's field-of-view range spreads beyond the screen, possibly rendering it impossible for the user to focus on the screen or resulting in less-than-enough sense of immersion. In that regard, when wearing an HMD, the user only sees a video displayed on the HMD, increasing the sense of immersion into the world of video and further enhancing entertaining nature of the game.

SUMMARY

Technical Problems

In order to increase the user's sense of immersion into the video world provided by the HMD, the display of a high-resolution image is required. However, it is difficult to draw a required high-resolution image with a single apparatus. For this reason, a possible solution would be to use a configuration that allows a high-resolution image to be displayed by dividing the screen for displaying a video into a plurality of regions, drawing, in parallel, images in the plurality of regions with a plurality of apparatuses, and synthesizing together the images in the plurality of regions.

Depending on the load during image processing, communication, and so on, however, drawing results produced by the plurality of apparatuses may not be collected by the time an image should be displayed, possibly delaying the image display. The present invention has been devised in light of the above circumstances, and a main object of the present invention is to provide a technology for suppressing delay during display of a high-resolution image.

Solution to Problems

In order to solve the above problems, an image processing system of a mode of the present invention includes a plurality of drawing sections, an image synthesis section, and a display control section. The plurality of drawing sections draw, in parallel, a plurality of individual images to be displayed in a plurality of individual regions obtained by dividing a frame display region. The image synthesis section generates a synthetic image obtained by synthesizing together the plurality of individual images drawn by the plurality of drawing sections. The display control section causes the synthetic image to be displayed on a head-mounted display. In the case where the individual image of at least one individual region is delayed at a frame processing timing, the image synthesis section generates a synthetic image as an individual image of that individual region by applying the individual image of a previous frame.

Another mode of the present invention is an image processing method. In this method, a single computer or a plurality of computers perform, in a distributed manner, a step of drawing, in parallel, a plurality of individual images to be displayed in a plurality of individual regions obtained by dividing a frame display region, a step of generating a synthetic image obtained by synthesizing together the plurality of individual images, and a step of causing the synthetic image to be displayed on a head-mounted display. The step of generating a synthetic image generates, in the case where the individual image of at least one individual region is delayed at a frame processing timing, a synthetic image as an individual image of that individual region by applying the individual image of a previous frame.

It should be noted that arbitrary combinations of the above constituent elements and conversions of expressions of the present invention between a system, a program, a recording medium storing a program, and so on are also effective as modes of the present invention.

Advantageous Effect of Invention

The present invention suppresses delay during display of a high-resolution image.

BRIEF DESCRIPTION OF DRAWINGS

FIG. 7 is a block diagram illustrating a functional configuration of a display control node illustrated in FIG. 4.

DESCRIPTION OF EMBODIMENTS

Figure 1:
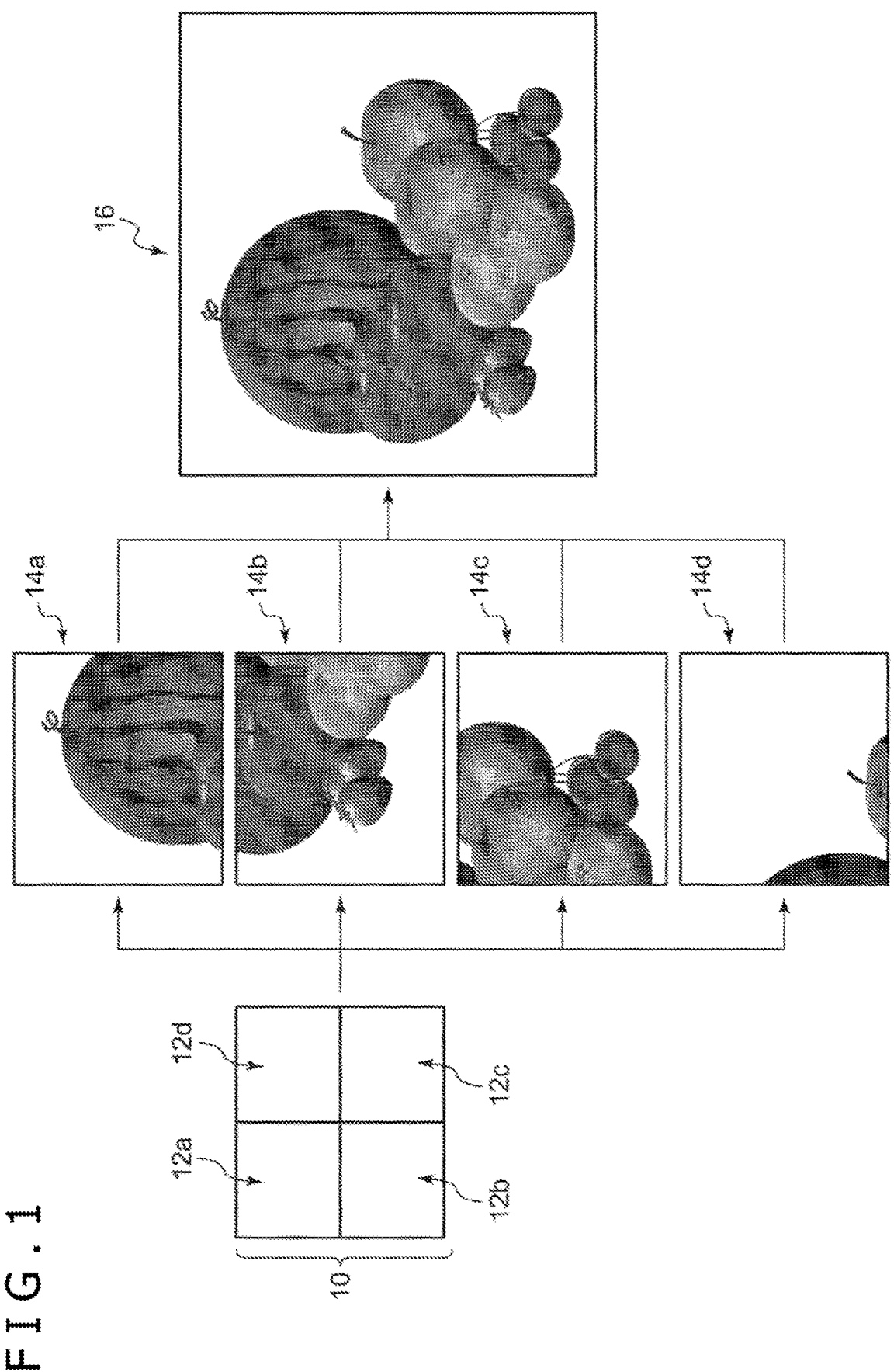
FIG. 1 is a diagram illustrating a principle behind an image processing method of a working example.

A summary of a working example will be described before describing the working example in detail. In order to provide users with a deep sense of immersion in virtual reality (VR) displayed on an HMD, it is said that the display of high-resolution images such as those in 8K and 16K will be required. Image processing associated with communication or generation of high-resolution images involves a significant load. The present inventor thought that the load associated with processing high-resolution images could be reduced by dividing the screen for displaying images into a plurality of regions, causing a plurality of drawing nodes (graphics processing units (GFUs)) to draw images in the plurality of regions, and causing a display node to integrate the images in the plurality of regions and display an integrated image.

However, all distributed drawing results are not necessarily collected by the time an image should be displayed due to a load associated with a communication process and/or a drawing process. In the case where at least some of the distributed drawing results are delayed, a possible option would be to wait for the arrival of the delayed distributed drawing results and update the image when the drawing results arrive. However, such a configuration may delay an update timing in the display node, possibly resulting in the user perceiving a delay.

For this reason, the working example proposes an image processing method for displaying images based on a previous frame as substitute images in regions where distributed drawing results are delayed of the plurality of regions obtained by dividing a screen, in other words, an image processing method for updating images only in updatable regions.

FIG. 1 is a diagram illustrating a principle behind the image processing method of the working example. In the image processing method of the working example: (1) a screen 10, a display region for displaying a frame image, is divided into a plurality of individual regions (individual region 12a, individual region 12b, individual region 12c, and individual region 12d). A frame image is, for example, an individual frame image included in a VR video and is an image displayed on a display device at a certain timing. It can also be said that the screen 10 is a region for rendering a frame image.

Next: (2) images of a plurality of individual regions (hereinafter referred to as "individual images") are generated in parallel by a plurality of nodes. For example, an individual image 14a to be displayed in the individual region 12a, an individual image 14b to be displayed in the individual region 12b, an individual image 14c to be displayed in the individual region 12c, and an individual image 14d to be displayed in the individual region 12d, are drawn in parallel by the four nodes. Next: (3) the display node generates a frame image 16 to be displayed on the display device by synthesizing together the individual images generated by the plurality of nodes in a distributed manner.

Currently, it is difficult to draw 8K or 16K images that are said to be required as VR images to be displayed on an HMD with a single device such as personal computer (PC). In the working example, real-time drawing of a high-resolution image is realized by performing the drawing process of the frame image 16 with a plurality of nodes (GPUs) in a distributed and parallel manner.

Here, if the drawing process of the individual region 12c is not complete by an image synthesis timing, the previous frame image is displayed in the individual region 12c. In other words, the previous frame image is continuously displayed. In the working example, the frame image 16 is generated by using the individual image used at the position of the individual region 12c at the time of generation of the previous frame image 16 as a substitute image to replace the individual image which would otherwise be used in the individual region 12c. It should be noted, however, that, in the case where the reception of a drawing result of the individual region 12c is delayed by a given time or more, the frame image 16 is generated after arrival of the image of the individual region 12c. That is, the delayed acquisition of an individual image and the generation of the frame image 16 are synchronized. This configuration is based on knowledge of the inventor to the effect that because, in the case where the delay is relatively small, human eyes are not likely to notice the delay in updating part of the frame image 16, it is less problematic in terms of user experience that there is no delay in updating the majority of the frame image 16.

Figure 2:
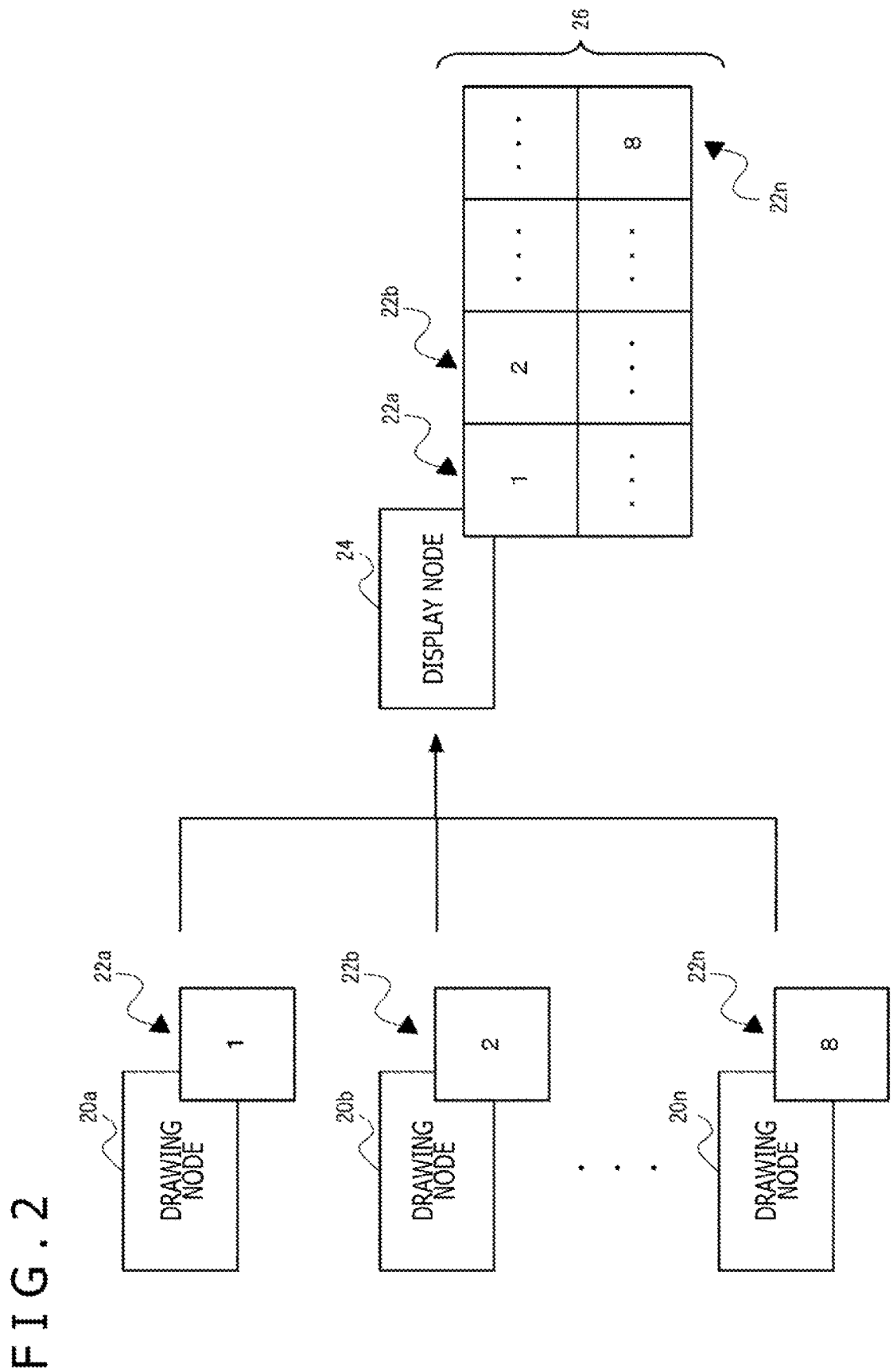
FIG. 2 is a diagram illustrating the principle behind the image processing method of the working example.

FIG. 2 illustrates the principle behind the image processing method of the working example. A drawing node 20a, a drawing node 20b, and so on up to a drawing node 20n draw, in parallel, an individual image 22a, an individual image 22b, and so on up to an individual image 22n, respectively. A display node 24 generates a frame image 26 by synthesizing together the individual image 22a, the individual image 22b, and so on up to the individual image 22n. In the case where the drawing of the individual image 22b close to a center of the screen is delayed, the display node 24 delays the display of the frame image 26 without displaying the previous frame image. In other words, the display node 24 updates the frame image 26 synchronously with the arrival of the delayed individual image 22b.

On the other hand, in the case where the drawing of the individual image 22a or the individual image 22n far from the screen center is delayed, the display node 24 displays the frame image 26 without delay by displaying the previous image in the delayed individual image region. In other words, the display node 24 prevents delayed display of the frame image 26. This configuration is based on knowledge of the inventor to the effect that because in the case where the number of divisions of the screen is sufficiently large, users are not likely to notice even several frames of delay in display in portions far from the screen center. It should be noted, however, that users notice a delay of an individual image if the delay is a given number of frames or more. For this reason, in the case where the drawing of the individual image 22a or the individual image 22n is delayed by a given time or more, the display node 24 updates the frame image 26 after arrival of the individual image 22a or the individual image 22n (in other words, after completion of the drawing).

Figure 3:
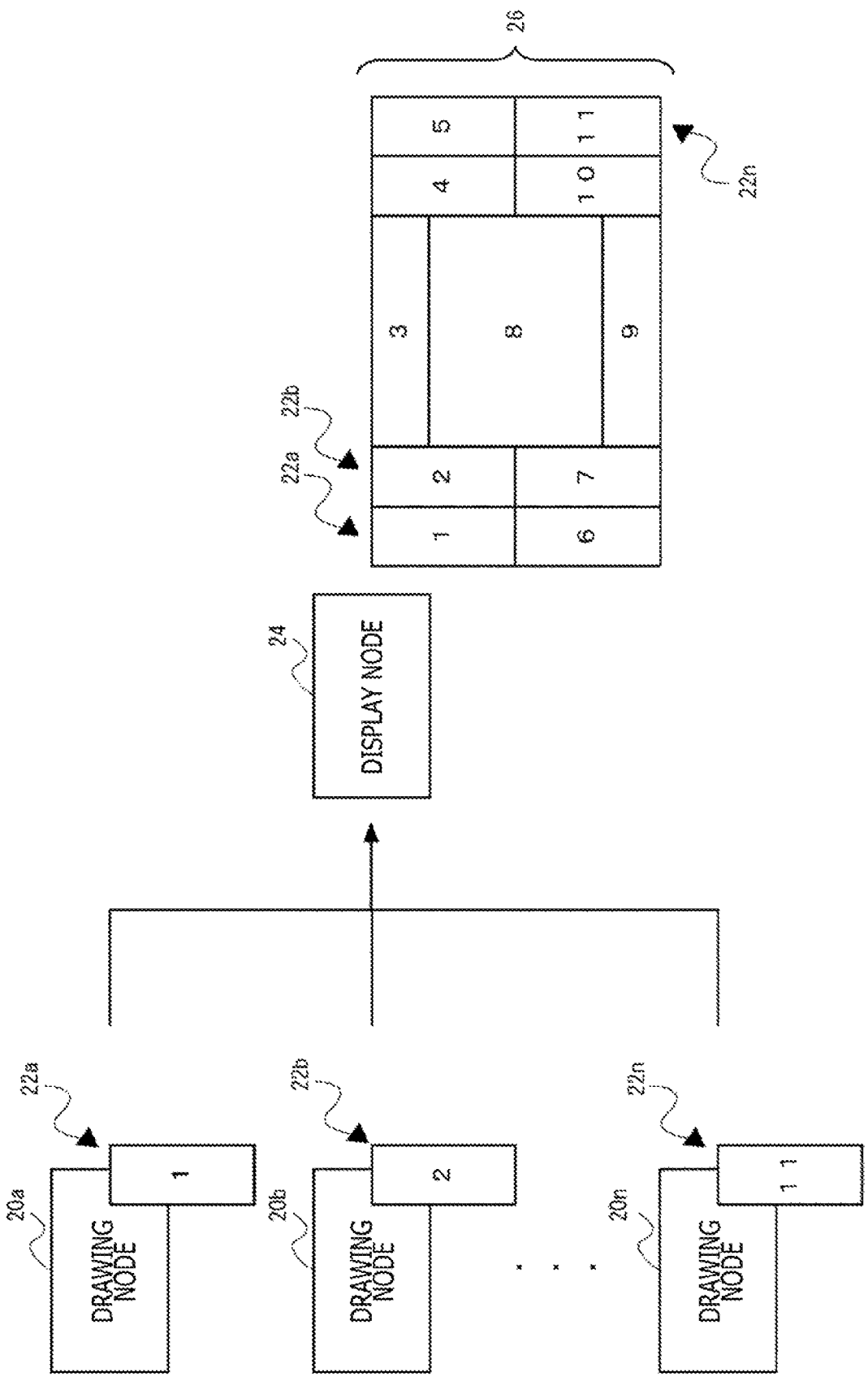
FIG. 3 is a diagram illustrating the principle behind the image processing method in a modification example.

FIG. 3 is a diagram illustrating the principle behind the image processing method in a modification example. The reference symbols in FIG. 3 correspond to those in FIG. 2. As illustrated in FIG. 3, the screen may not be divided evenly. For example, the screen may be divided such that pixel counts of the individual regions far from the screen center are smaller than in the individual regions close to the screen center (in other words, such that the sizes are smaller). Also, the screen may be divided such that the farther the individual region is from the screen center, the smaller the pixel count. Then, only in the case where the drawing of the individual image far from the screen center (e.g., the individual image 22a, the individual image 22b, or the individual image 22n) is delayed, the previous frame image may be displayed in the delayed individual image region. This makes it even less likely for users to notice delayed drawing of an image.

Figure 4:
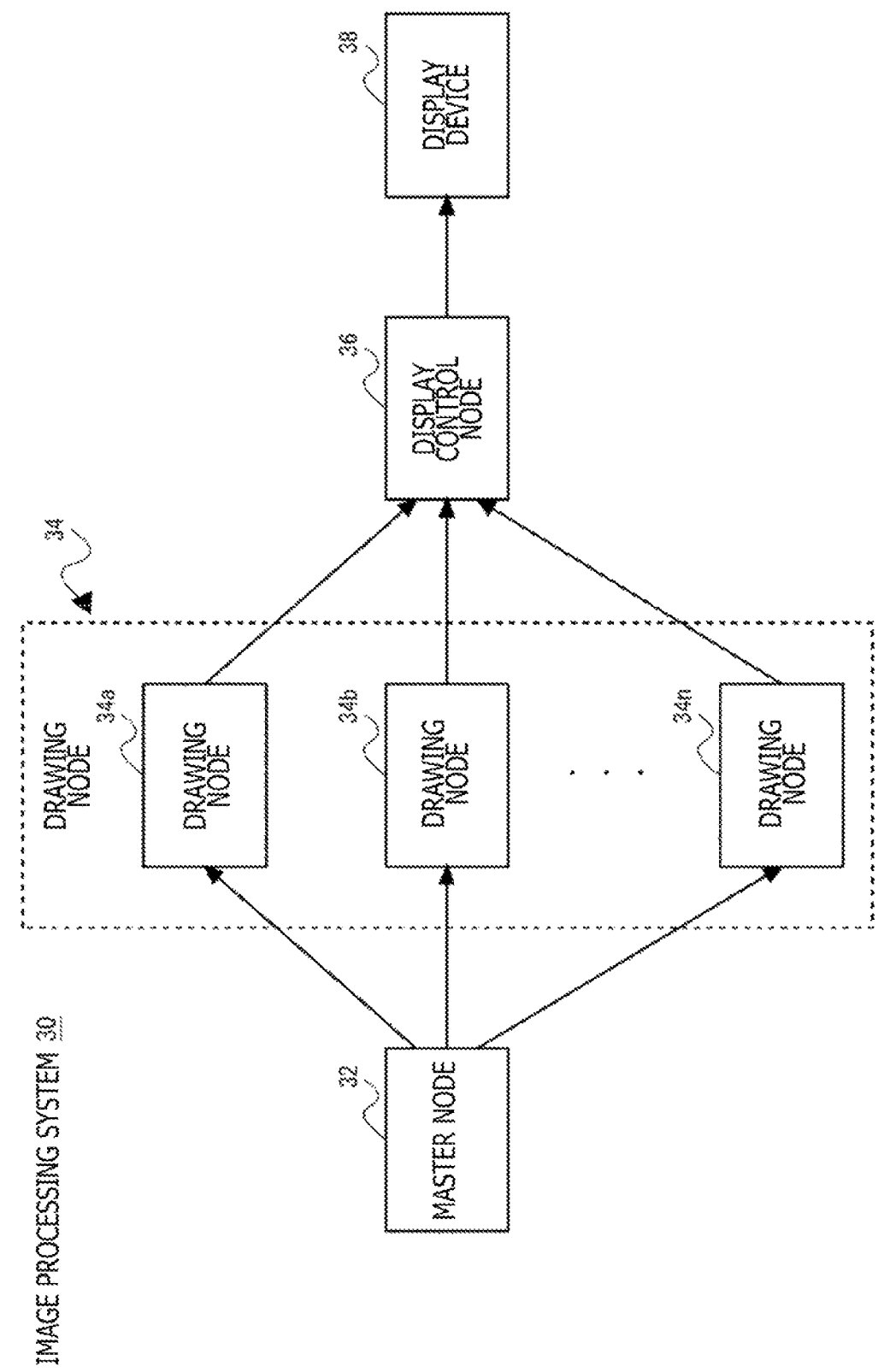
FIG. 4 is a diagram, illustrating a configuration of an image processing system of the working example.

A detailed description will be given below of a configuration of the working example. FIG. 4 illustrates a configuration of an image processing system of the working example. An image processing system 30 includes a master node 32, a drawing node 34a, a drawing node 34b, and a drawing node 34n that are collectively referred to as drawing nodes 34, a display control node 36, and a display device 38. These apparatuses are connected to each other via a communication network including local area network (LAN), wide area network (WAN), and the Internet.

The display device 38 sequentially displays a plurality of frame images included in a video. The display device 38 of the working example is a non-transmissive HMD and causes a VR video (VR image) output from the display control node 36 to be displayed on a display section. The master node 32, the drawing nodes 34, and the display control node 36 generate frame images to foe displayed on the display device 38 in a coordinated fashion.

Figure 5:
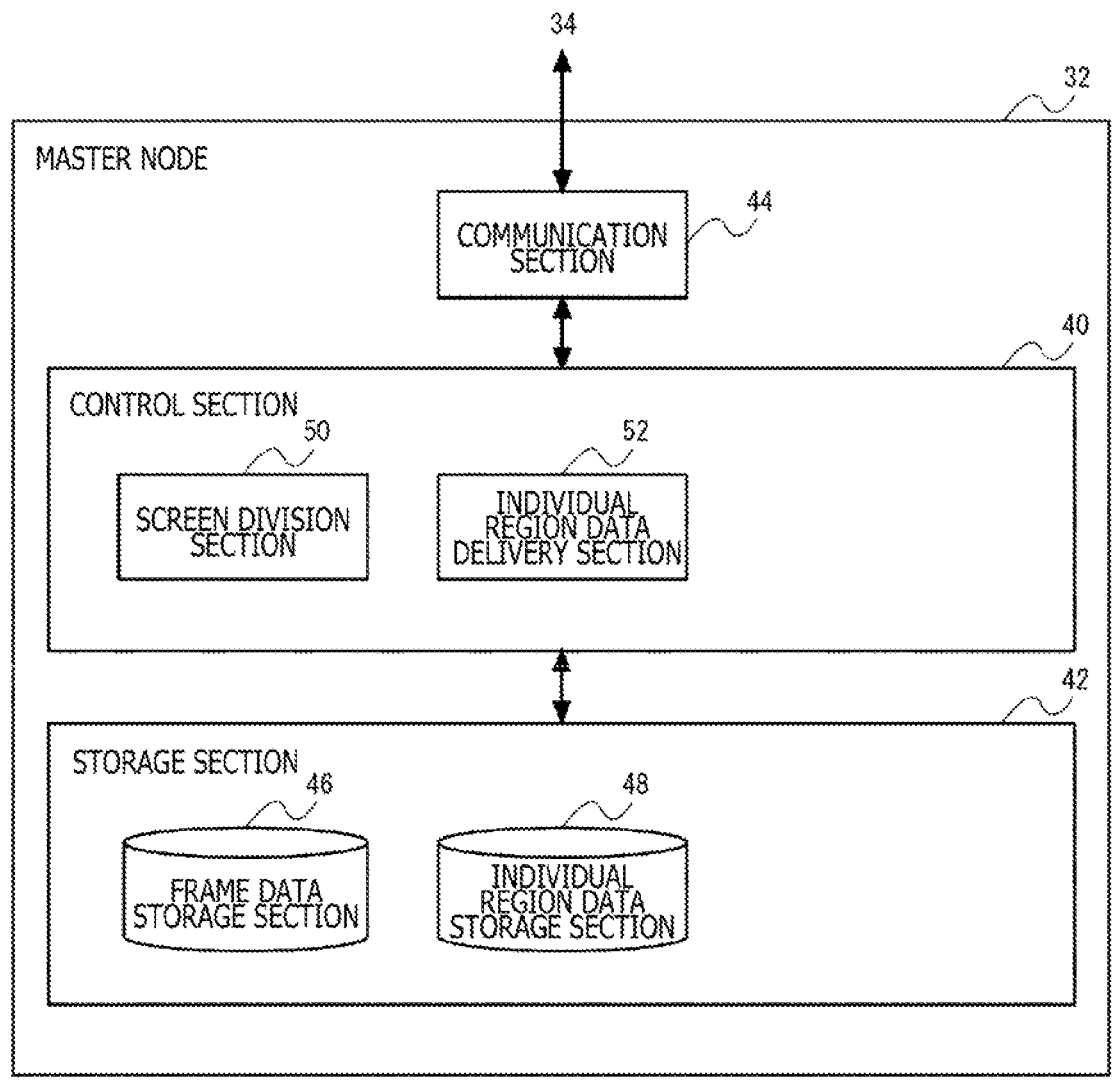
FIG. 5 is a block diagram illustrating a functional configuration of a master node illustrated in FIG. 4.

FIG. 5 is a block diagram illustrating a functional configuration of the master node 32 illustrated in FIG. 4. The master node 32 includes a control section 40, a storage section 42, and a communication section 44. The control section 40 performs various data processing tasks. The storage section 42 is a storage region for storing data referenced or updated by the control section 40. The communication section 44 communicates with an external apparatus in accordance with a given communication protocol. The control section 40 exchanges data with the plurality of drawing nodes 34 via the communication section 44. The master node 32 may be a data processing apparatus included in a cloud system (e.g., server).

Each of the blocks illustrated in the block diagrams of the present specification can be realized by elements such as computer central processing unit (CPU) and memories and mechanical apparatuses in terms of hardware and computer programs and so on in terms of software. Here, however, functional blocks realized by coordination therebetween are depicted. Therefore, it is to be understood by those skilled in the art these functional blocks can be realized in a variety of ways by a combination of hardware and software.

For example, the functions of each block of the control section 40 may be implemented as a computer program, and the computer program may be installed in a storage of the master node 32. The CPU of the master node 32 may deliver the functions of each block of the control section 40 by loading the computer program into the main memory for execution. Also, the storage section 42 may be realized by the main memory and the storage of the master node 32. The same is true for the drawing nodes 34 and the display control node 36 illustrated in FIG. 3.

The storage section 42 includes a frame data storage section 46 and an individual region data storage section 48. The frame data storage section 46 holds data of a plurality of frames included in a video to be displayed on the display device 38. Frame data held in the frame data storage section 46 includes data required for rendering a frame image and includes, for example, object shape, viewpoint from which the object is viewed, object surface texture (information regarding texture mapping), light source, shading information, and so on.

The individual region data storage section 48 holds data of a plurality of individual regions included in the screen for displaying a frame image. Individual region data held by the individual region data storage section 48 includes data required for rendering individual images, images of the individual regions. For example, individual region data includes data extracted from frame data, specifically includes information regarding the shape and texture of the object existing in each individual region, and further includes viewpoint, light source, and shading information.

It should be noted that data required for rendering held by the frame data storage section 46 and the individual region data storage section 48 may be point group data that represents appearance of a shooting space with a set of a plurality of points. Point group data may be generated by synthesizing together output images of a plurality of cameras that shot the same space from different positions and angles. Also, each piece of point group data includes three-dimensional coordinate data indicating a position in the shooting space and data indicating color. Three-dimensional coordinate data may be, for example, a combination of a horizontal (X-axis direction) coordinate value, a vertical (Y-axis direction) coordinate value, and a deep (Z-axis direction) coordinate value representing an absolute position in the shooting space. Also, data indicating color may be, for example, a red, green, blue, alpha (RGBA) color model value.

The control section 40 includes a screen division section 50 and an individual region data delivery section 52. The screen division section 50 divides a screen, a region for displaying a frame image, into a plurality of individual regions. The screen division section 50 extracts a plurality of pieces of individual region data for drawing a plurality of individual region images from frame data stored in the frame data storage section 46 and stores each piece of individual region data in the individual regional data storage section 48.

The screen division section 50 of the working example divides the screen evenly into four individual regions. The screen may be divided, for example, into an upper left region, a lower left region, a lower right region, and an upper right region as illustrated in FIG. 1. As a modification example, the screen may be divided into a plurality of regions on the basis of other criteria. As screen division parameters, resolution, drawing load, human (e.g., user wearing an HMD) line of sight, and three-dimensional (3D) drawing hardware capabilities (GPU processing speed, CPU processing speed, memory size, memory bandwidth) may be used.

Specifically, the screen may be divided such that the resolution close to the screen center (center of line of sight) may be increased, whereas the resolution far from the screen center (center of line of sight) may be reduced. Also, the screen may be divided such that a drawing load is leveled out over a plurality of regions. Also, the resolution or the drawing load on the individual regions assigned to the drawing nodes 34 with high drawing capability may be increased relatively, whereas the resolution or the drawing load on the individual regions assigned to the drawing nodes 34 with low drawing capability may be reduced relatively.

The individual region data delivery section 52 holds a correspondence between the plurality of individual regions and the plurality of drawing nodes 34. The individual region data delivery section 52 sends the individual region data of each of the plurality of individual regions to the corresponding drawing node. For example, a correspondence may be defined that associates the individual region 12a (i.e., upper left region) illustrated in FIG. 1 and the drawing node 34a with each other, the individual region 12b (i.e., lower left region) illustrated in FIG. 1 and the drawing node 34b with each other, and the individual region 12d (i.e., upper right region) illustrated in FIG. 1 and the drawing node 34n with each other. In this case, the individual region data delivery section 52 sends the individual region data of the individual region 12a to the drawing node 34a, the individual region data of the individual region 12b to the drawing node 34b, and the individual region data of the individual region 12d to the drawing node 34n.

Figure 6:
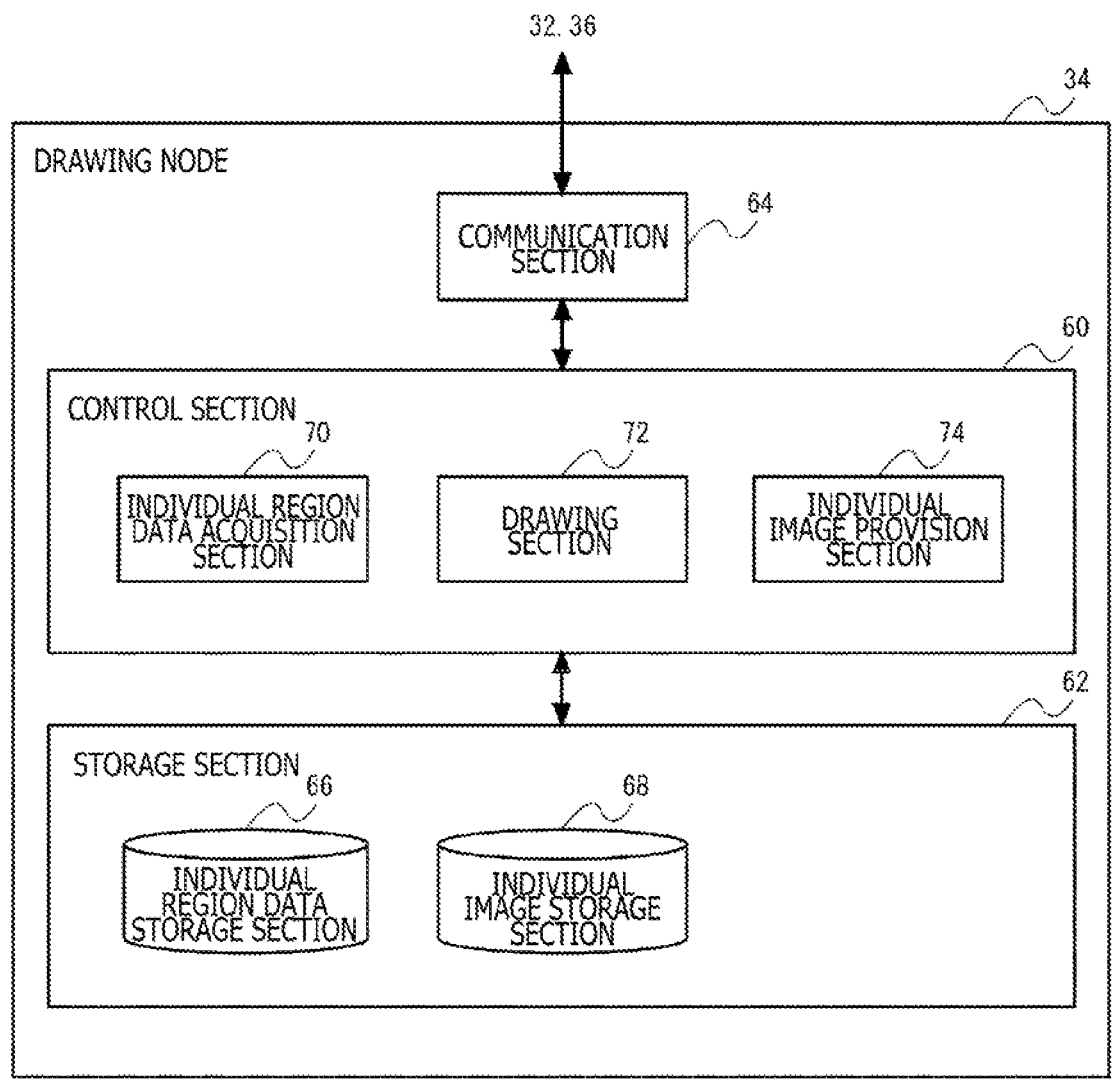
FIG. 6 is a block diagram illustrating a functional configuration of each of a plurality of drawing nodes illustrated in FIG. 4.

FIG. 6 is a block diagram illustrating a functional configuration of each of the plurality of drawing nodes 34 illustrated in FIG. 4. A control section 60, a storage section 62, and a communication section 64 illustrated in FIG. 6 correspond to the control section 40, the storage section 42, and the communication section 44 illustrated in FIG. 5. The plurality of drawing nodes 34 correspond to the drawing node 20a, the drawing node 20b, and so on up to the drawing node 20n illustrated in FIG. 2 and may be data processing apparatuses (e.g., servers) provided on the cloud.

The storage section 62 includes an individual region data storage section 66 and an individual image storage section

68. The individual region data storage section 66 holds individual region data delivered to its own apparatus. The individual image storage section 68 holds individual image data generated by a drawing section 72 which will be described later.

The control section 60 includes an individual region data acquisition section 70, the drawing section 72, and an individual image provision section 74. The individual region data acquisition section 70 acquires individual region data sent from the master node 32 and stores the data in the individual region data storage section 66. The drawing section 72 generates individual image data, bitmap image to be displayed in the individual region by reading individual region data from the individual region data storage section 66 and performing a known rendering process and stores the individual image data in the individual image storage section 68. The individual image provision section 74 sends the individual image data generated by the drawing section 72 to the display control node 36.

FIG. 7 is a block diagram illustrating a functional configuration of the display control node 36 illustrated in FIG. 4. A control section 80, a storage section 82, and a communication section 84 illustrated in FIG. 7 correspond to the control section 40, the storage section 42, and the communication section 44 illustrated in FIG. 5. The display control node 36 corresponds to the display node 24 illustrated in FIG. 2 and may be a stationary gaming console or a PC installed at a user's home. Also, the display control node 36 and the display device 38 may be configured integrally and may be, for example, a smartphone or a portable gaming console.

The storage section 82 includes an individual image storage section 86 and a frame image storage section 88. The individual image storage section 86 holds individual image data supplied from the plurality of drawing nodes 34. The frame image storage section 88 holds frame image data generated by an image synthesis section 92 which will be described later.

The control section 80 includes an individual image acquisition section 90, the image synthesis section 92, and a frame image output section 94. The individual image acquisition section 90 acquires a plurality of pieces of individual image data sent from the plurality of drawing nodes 34 and successively stores the individual image data in the individual image storage section 86. The image synthesis section 92 generates frame image data to be displayed on the display device 38 by synthesizing together the plurality of pieces of individual image data stored in the individual image storage section 86 and stores the frame image data in the frame image storage section 88. The frame image output section 94 outputs the frame image held in the frame image storage section 88 to the display device 38 synchronously with a frame display timing for display on the display device 38.

The master node 32 may include, in respective pieces of individual region data to be delivered to the plurality of drawing nodes 34, a frame identification (ID) (information allowing for identification of a frame image display timing) and a region ID (information allowing for identification of the position of the individual region within the screen). Each of the plurality of drawing nodes 34 includes, in the individual image data to be provided to the display control node 36, a frame ID and a region ID. The drawing nodes 34 may generate frame images by arranging a plurality of pieces of individual image data to which the same frame ID has been assigned at the position identified by the region ID and synthesizing together these pieces of individual image data.

The image synthesis section 92 detects a predetermined frame processing timing (e.g., display timing or drawing timing) by a known technique and generates a frame image synchronously with the timing. In the case where, at a frame processing timing, the individual image of at least one of the individual regions of the frame is delayed, and where, for example, the image has yet to be received from the drawing node 34, the image synthesis section 92 generates a frame image by applying the individual image of the previous frame as an individual image of the individual region. While, on one hand, the image synthesis section 92 applies the individual image of the previous frame to the individual region whose individual image has been delayed, the image synthesis section 92 generates, on the other hand, a frame image by applying the individual images of the current frame that arrived by the processing timing to other individual regions with no delay in their individual images.

An individual region whose individual image that would otherwise arrive from the drawing node 34 is delayed, in other words, an individual region that has yet to receive its individual image by the original reception timing will be referred to as a "delayed region." The image synthesis section 92 of the working example uses the individual image of the immediately previous frame as an individual image of the previous frame. In other words, the image synthesis section 92 uses, as an individual image of a delayed region, the individual image of the delayed region that was already acquired from the drawing node 34 immediately previously. This makes it possible to display details that closely resemble the individual image that would otherwise be displayed.

As a modification example, the storage section 82 of the display control node 35 may store, in advance, candidate image data obtained by drawing (shooting) an appearance of a 3D space, a drawing target, from all directions in association with a user's viewpoint position, direction and angle of line of sight, and so on. The image synthesis section 92 may extract an individual image of a delayed region from candidate image data associated with the user's viewpoint position, the direction and angle of line of sight, and so on. As another modification example, the image synthesis section 92 may generate an individual image of a delayed region by applying a given filter to the individual image of the previous frame. As still another modification example, in the case where an individual image of a region is delayed, the image synthesis section 92 may generate, as an individual image of a delayed region and by an interpolation process, an intermediate image between the individual image received earlier as an individual image of the region and the individual image received after the delay.

Also, in the case where a length of time for which an individual image of an individual region has not been available is less than a given time, the image synthesis section 92 generates, as an individual image of the individual region (i.e., delayed region), a synthetic image by applying the individual image of the previous frame. This given time may be determined as a time value such as 100 milliseconds or as a frame count such as five frames. In the case where the length of time for which an individual image of an individual region has not been available is equal to the given time or more, in other words, in the case where the individual image of the individual region is delayed by the given time or more, the image synthesis section 92 waits until the individual image of the individual region arrives from the drawing node 34 and generates a frame image by synthesizing together the individual images that arrived in time and the individual image that arrived late. That is, the display of a frame image is delayed synchronously with the delay of an individual image.

Further, in the case where an individual region whose individual image is not available does not fall under a category of a given region of interest in which the user is likely to be keenly interested, the image synthesis section 92 generates, as an individual image of the individual region, a frame image by applying the individual image of the previous frame. In the case where an individual region whose individual image is not available falls under the category of a region of interest, the image synthesis section 92 waits until the individual image of the individual region arrives from the drawing node 34 and generates a frame image by synthesizing together the individual images that arrived in time and the individual image that arrived late. That is, the display of a frame image is delayed synchronously with the delay of an individual image of a region of interest.

Regions of interest of the working example are individual regions located close to the center of the screen for displaying a frame image. For example, the region where the individual image 22b is displayed in FIG. 2 is a region of interest. On the other hand, regions that do not fail under the category of regions of interest may be individual regions far from the screen center (those at a distance of a given value or more from the screen center). For example, the region where the individual image 22a or the individual image 22n is displayed in FIG. 2 is such a region. As a modification example, regions of interest may be individual regions located close to the center of user's line of sight, and regions that do not fall under the category of regions of interest may be individual regions far from the center of user's line of sight (those at a distance of a given value or more from the center of line of sight). The image synthesis section 92 may detect the center position of the user's line of sight on the basis of the direction and angle of the user's line of sight detected by a sensor (not depicted) of the display device 38 (e.g., HMD). In this modification example, in the case where the center of the user's line of sight falls on an edge of the screen, the screen center may be a region that does not fall under the category of a region of interest.

Figure 8:
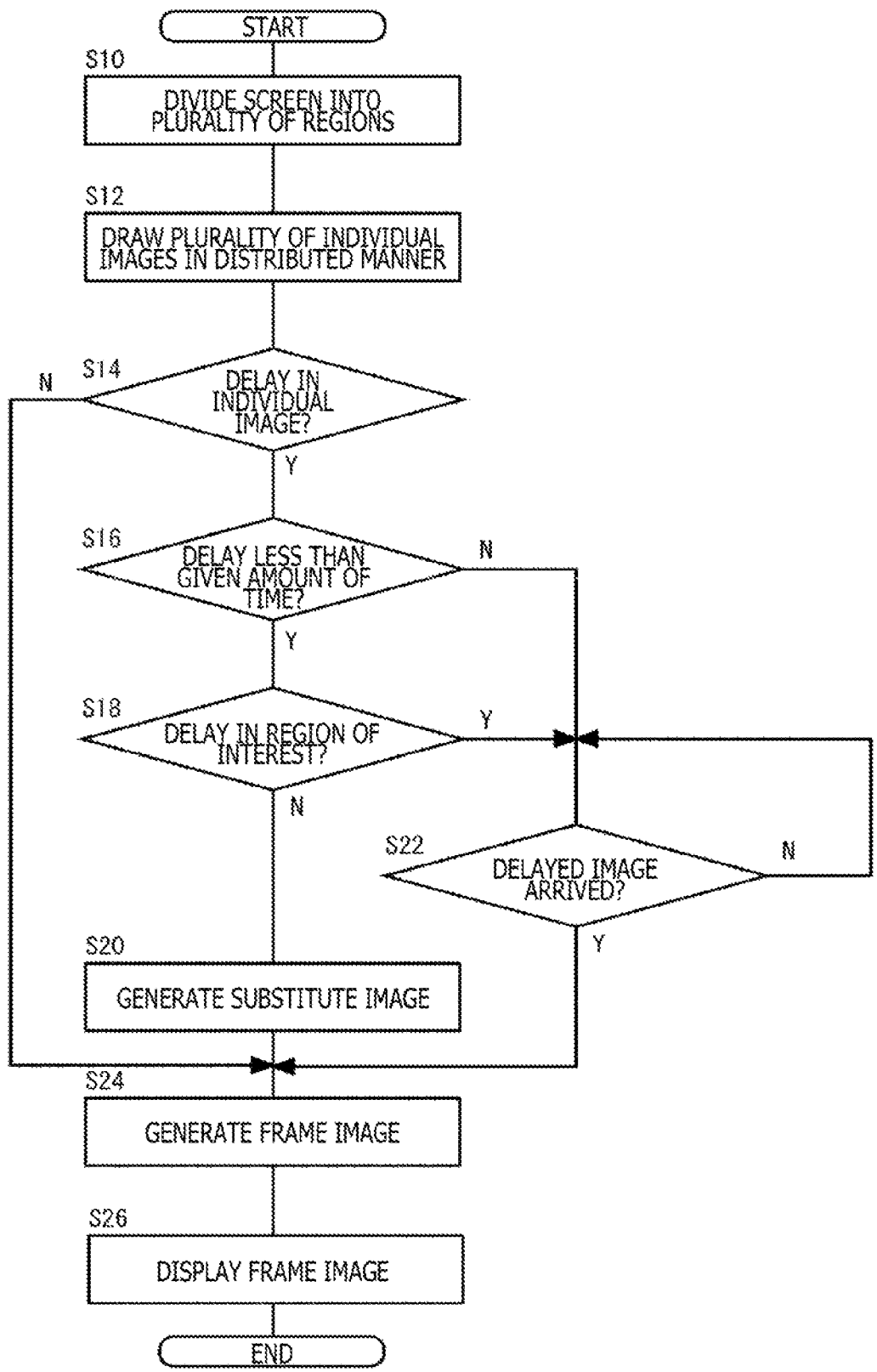
FIG. 8 is a flowchart illustrating operation of the image processing system, of the working example.

A description will be given of operation of the image processing system 30 configured as described above. FIG. 8 is a flowchart illustrating operation of the image processing system 30 of the working example. The master node 32 divides the frame image display screen into a plurality of individual regions and sends a plurality of pieces of individual region data for rendering a plurality of individual region images to the drawing nodes 34 in a distributed manner (S10). The plurality of drawing nodes 34 draw, in parallel, a plurality of individual images of the plurality of individual regions (S12). In the case where all the plurality of individual images are acquired from the drawing nodes 34 by a frame image drawing timing (or a frame image display timing) (N in S14), the display control node 36 generates a frame image by synthesizing together the plurality of these individual images (S24).

In the case where at least one of the plurality of individual images is not available by a frame image drawing timing (or a frame image display timing) (Y in S14), the master node 32 decides whether or not the delay is less than the given time and also decides whether or not the delayed region falls under the category of a region of interest. If the delay is less than the given time (Y in S16), and if the delayed region does not fall under the category of a region of interest (M in S18), the master node 32 generates an individual image to be displayed in the delayed region (referred to as a "substitute image" here) (S20). Then, the master node 32 generates a frame image by synthesizing together the individual images of the current frame that arrived by the drawing timing and the substitute image generated in S20 (S24).

In the case where the delay is equal to the given time or more (N in S16), or in the case where the delayed region falls under the category of a region of interest (Y in S18), the display control node 36 waits until the individual image that would otherwise foe displayed in the delayed region (referred to as a "delayed image") arrives from the drawing node 34 (N in S22). When the delayed image is received from the drawing node 34 (Y in S22), the display control node 36 generates a frame image by synthesizing together the individual images of the current frame that arrived before the drawing timing and the delayed image of the current frame (S24). The drawing node 34 outputs the generated frame image to the display device 38, and the display device 38 displays the frame image input from the drawing node 34 (S26).

The image processing system 30 of the working example displays the image of the previous frame in the region where the drawing is delayed on the basis of a user's characteristic in the case of watching a VR video with an HMD, i.e., the characteristic that when the number of divisions of the screen is sufficiently large, a delay taking place in a portion that is not a region of interest is not likely to be noticed even in the event of several frames of delay. This prevents the user from feeling a sense of discomfort caused by delayed drawing. Also, in the case where the updating of an individual image is delayed by a certain number of frames or more, the sense of discomfort felt by the user can be kept to a minimum by waiting for the updating of the delayed individual image such that the frame image as a whole is synchronized.

The present invention has been described above on the basis of the working example. It should be understood by those skilled in the art that this working example is illustrative, that the combination of different constituent elements and processes can be modified in various ways, and that such modification examples also fall within the scope of the present invention. A description will be given below of modification examples.

A first modification example will be described. The master node 32 of the above working example sent, to each of the plurality of drawing nodes 34, individual region data for generating an image of the individual region with which each node was associated in advance. For example, the screen for displaying a frame image was divided into four parts, and individual region data corresponding to the upper left region was sent to the drawing node 34a, individual region data corresponding to the lower left region was sent to the drawing node 34b, and individual region data corresponding to the upper right region was sent to the drawing node 34n.

Here, the determination of destinations of individual region data by uniformly dividing the screen into four equal parts may lead to uneven distribution of a load on specific drawing nodes. For example, a situation may arise in which while a certain drawing node handles a drawing load that is significantly above a tolerance, other drawing node handles a drawing load that is significantly below the threshold. As a result, the drawing node with a concentrated load is likely to be late in performing its drawing process. For this reason, the screen division section 50 of the master node 32 in the modification example dynamically determines the manner in which to divide the screen to ensure that the load is distributed as evenly as possible among the drawing nodes. The screen division section 50 may determine the size of each individual region (in other words, range) such that a variance of the load among the drawing nodes is equal to a given value or less.

Figures 9, 10:
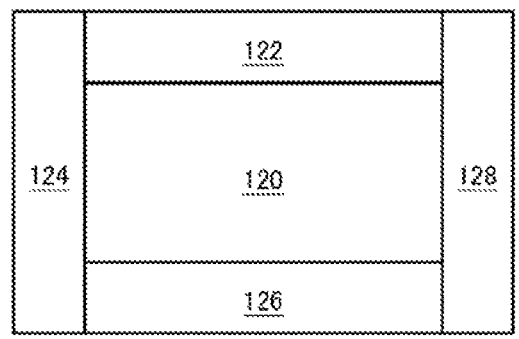
FIG. 9 depicts diagrams schematically illustrating a method for levelling out a load on the plurality of drawing nodes.
FIG. 10 is a diagram schematically illustrating a screen divided into a plurality of regions.

FIG. 9 depicts diagrams schematically illustrating a method for levelling out a load on the plurality of drawing nodes. Here, a drawing node 34c (not depicted) exists as a fourth drawing node in addition to the drawing node 34a, the drawing node 34b, and the drawing node 34n illustrated in FIG. 4. As illustrated in FIG. 9(a), the screen division section 50 divides the screen for displaying a frame image into four equal parts. By default, the drawing node 34a takes charge of drawing a region 100, the drawing node 34b takes charge of drawing a region 102, the drawing node 34c takes charge of drawing a region 104, and the drawing node 34n takes charge of drawing a region 106.

The number in each of the regions in FIG. 9(a) represents the magnitude of the load associated with the drawing process. The screen division section 50 may calculate the drawing load of each region by a known method on the basis of data for drawing each region (equivalent to individual region data in the working example) or may hold, in the frame data storage section 46, the drawing load of each region, calculated in advance, in the case of division of the screen into four parts. Also, in the case where frame data is point group data, the number in each of the regions may represent the ratio of the number of points included in each region. In the example illustrated in FIG. 9(a), the simple division of the screen into four equal parts results in the load being concentrated on the drawing node 34a.

We assume here that the magnitude of the permissible load in each drawing node (hereafter referred to as a "permissible load") has been set to "5" in advance. In the case where the load exceeds "5" in any of the regions, the screen division section 50 divides the region with the maximum load into two parts along its long side axis as illustrated in FIG. 9(b). For example, the region may be divided into two parts by joining midpoints of the long sides. In the first division illustrated in FIG. 9(b), the load of one region still exceeds "5." Therefore, the screen division section 50 divides the region with the maximum load into two parts again as illustrated in FIG. 3(c).

In the case where the load of each region falls to the permissible load or less, an adjustment section calculates the difference between the load of each region and the permissible load. FIG. 9(d) illustrates these calculation results. As illustrated in FIG. 9(e), the screen division section 50 brings together the regions, each of whose difference from the permissible load is equal to a given value ("4" here) or more, with an adjacent region. FIG. 9(f) illustrates the results of integration of the regions. The screen division section 50 terminates the adjustment process in the case where the variance of the load among the drawing nodes is equal to a given value (e.g., "1.6") or less. The individual region data delivery section 52 of the master node 32 sends drawing target block data corresponding to a region 110 to the drawing node 34a and drawing target block data corresponding to a region 112 to the drawing node 34b. Also, the individual region data delivery section 52 sends drawing target block data corresponding to a region 114 to the drawing node 34c and drawing target block data corresponding to a region 116 to the drawing node 34n.

The variance among the regions 100 to 106 in FIG. 9(a) is "13.5." On the other hand, the variance among the regions 110 to 116 in FIG. 9(f) has dropped to "1.5." Thus, the mode of the present modification example allows the load to be levelled out among the drawing nodes, preventing the concentration of a load on specific nodes and possible delay in drawing in these specific nodes.

A second modification example will be described. The second modification example proposes a configuration that realizes real-time drawing by reducing the resolution of the surrounding regions so as to reduce the drawing load while at the same time increasing the resolution of the screen center regions during image drawing. It should be noted, however, that even such a configuration may not foe able to draw the surrounding regions in time to display a frame image depending on details to be drawn. For this reason, delay in displaying a frame image is suppressed by tolerating a drawing delay in the surrounding regions. It should be noted that the screen center regions can also be said to be regions of interest and may be regions of the center of line of sight.

FIG. 10 schematically illustrates a screen divided into a plurality of regions. The screen in FIG. 10 is divided into five regions, namely, a center region 120, a surrounding region 122, a surrounding region 124, a surrounding region 126, and a surrounding region 128. The screen division section 50 of the master node 32 of the present modification example divides the frame display region such that the pixel counts of the individual regions that do not fall under the category of a region of interest are smaller than the pixel count of the individual region that falls under the category of the region of interest. That is, the screen division section 50 divides the screen such that the pixel count of the center region 120 is larger than the pixel count of any of the surrounding region 122, the surrounding region 124, the surrounding region 126, and the surrounding region 128. The individual region data delivery section 52 of the master node 32 sends individual region data of the center region 120 to the drawing node 34a, and individual region data of the surrounding region 122, the surrounding region 124, the surrounding region 126, and the surrounding region 124, the surrounding region 126, and so on up to the drawing node 34n. The drawing nodes 34 have the same configuration as in the working example.

In the case where the image of the center region 120 is not available by a given timing, the display control node 36 waits until the arrival of the image and generates a frame image. On the other hand, in the case where the image of the surrounding region 122, the surrounding region 124, the surrounding region 126, or the surrounding region 128 is not available by a given timing, the display control node 36 generates a frame image without delay by tolerating a certain time of delay, i.e., applying the image of the previous frame to the region whose image drawing has been delayed. This suppresses a delay in displaying a frame image as a whole.

Figure 11:
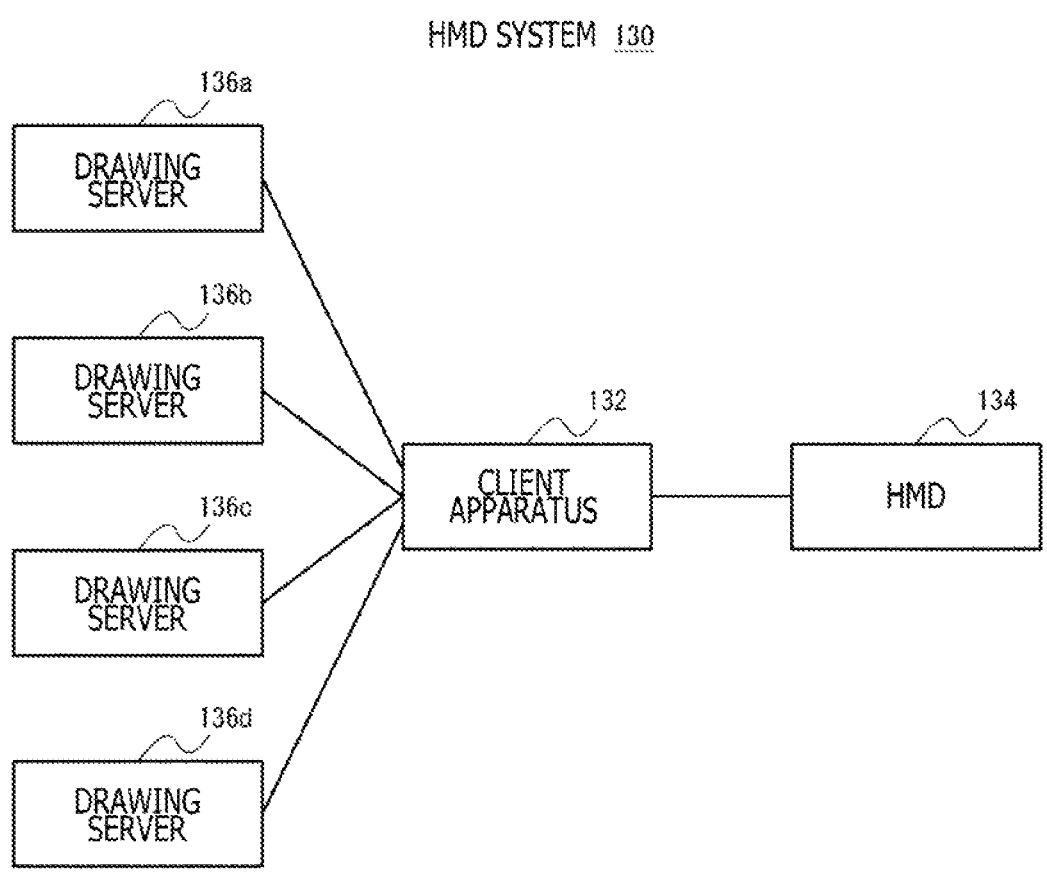
FIG. 11 is a diagram illustrating a configuration of an HMD system of a third modification example.

A third modification example will be described. FIG. 11 illustrates a configuration of an HMD system 130 of the third modification example. A client apparatus 132 corresponds to the display control node 36 of the working example and is, for example, a gaming console that executes a VR application. The client apparatus 132 generates a VR space image (referred to as a "VR" image) and displays the image on an HMD 134. We assume that the VR image display region of the present modification example is divided into five regions as with the screen illustrated in FIG. 10. During drawing of a VR image, high real-timeness is required in drawing the center region 120 of the screen (can also be said to be the center region of line of sight). For this reason, the client apparatus 132 takes charge of drawing the center region 120.

In the present modification example, the process of drawing the surrounding regions is handled by a server on the cloud so as to use the client apparatus 132 to its full capability for drawing the center region 120. Specifically, the client apparatus 132 sends, to a drawing server 136a, a drawing server 136b, a drawing server 136c, and a drawing server 136d, data for drawing the surrounding region 122, the surrounding region 124, the surrounding region 126, and the surrounding region 128. The plurality of drawing servers correspond to the draining nodes 34 of the working example and draw images of the surrounding regions in parallel.

The client apparatus 132 generates a frame image by synthesizing together an image of the center region 120 drawn by itself and images of the plurality of surrounding regions drawn in parallel by the plurality of drawing servers. The client apparatus 132 outputs the generated frame image to the HMD 134 for display. It should be noted, however, that the image drawn by each of the drawing servers is sent to the client apparatus 132 via a communication network, which leaves room for possible delay. However, the target drawn by each drawing server is an image of a surrounding region. Therefore, a certain time of delay is tolerated as in the working example, and the image of the previous frame is applied to the region whose image drawing has been delayed, thereby generating a frame image without delay. This allows the latest details to be displayed in the center region 120 of the frame image where the user's attention is focused and at the same time suppresses a delay in displaying a frame image caused by a delay in drawing the surrounding regions.

It should be noted that the HMD system 130 may further include the master node 32 as in the image processing system 30 of the working example. The master node 32 may deliver data for drawing individual images of the surrounding regions to the plurality of drawing servers and, at the same time, send data for drawing an individual image of the center region 120 directly to the client apparatus 132 for generation of an individual image of the center region 120 by the client apparatus 132. It is an aspect suitable, for example, for streaming a real space or VR space video.

A fourth modification example will be described. As has partially been described earlier, the technology of the working example is applicable to rendering using point group (point cloud) data such as coordinate data of a plurality of points included in a shooting space and color data. In the present modification example, the screen division section 50 of the master node 32 also divides the screen, a frame image display region, into a plurality of individual regions. The screen division section 50 extracts, from point group data as frame data, point group data for drawing the image of each individual region (hereinafter referred to as "individual point group data"). For example, the screen division section 50 may set, on the basis of the coordinates of each point included in the point group, data of the points to be displayed in each individual region as individual point group data of each individual region.

The individual region data delivery section 52 of the master node 32 sends, to the drawing node 34 that should generate an image of each individual region, individual point group data of each individual region. Each of the plurality of drawing nodes 34 generates an individual image of the individual region taken charge of by itself on the basis of the individual point group data received from the master node 32. The display control node 36 generates a frame image by synthesizing together individual images generated in parallel by the plurality of drawing nodes 34 and displays the frame image on the display device 38.

Here, the point group is not uniformly dispersed across the plurality of drawing nodes 34. For this reason, all the drawing nodes 34 do not necessarily complete their drawing processes at the same time (or by a given timing). As a result, a delay in the drawing process of some of the drawing nodes 34 leads to delayed display of a frame image. For this reason, the display control node 36 suppresses, as much as possible, a delay in displaying the frame image as a whole by tolerating a drawing delay in regions (hereinafter referred to as "surrounding regions") far from regions of interest (e.g., screen center or center of line of sight) as in the working example. Specifically, in the case where an individual image of a surrounding region is delayed, the image synthesis section 92 of the display control node 36 generates a frame image by using the individual image acquired from the drawing node 34 earlier. During display of a VR image on an HMD, in particular, users are not likely to feel a sense of discomfort even when a previous image is displayed in a surrounding region. Therefore, the technology of the present modification example is suitable for application to such a purpose.

A fifth modification example will be described. Ray tracing is a technique for drawing realistic film-like computer graphics (CG). In ray tracing, a ray is fired from a viewpoint (e.g., user's viewpoint position in a VR space which can be said to be a virtual camera's position) for each pixel on the screen that corresponds to the image to foe presented to the user, reflection and other factors caused by the object existing in the target space to be drawn are calculated, and the rays reaching the viewpoint from the light source are traced back, thereby determining the color of each pixel. For example, it is possible to determine the color of a pixel on the basis of the fact that the ray passing through the pixel fails to reach the light source. Also, in the case where the ray passing through a pixel reaches the light source after being reflected by an object, it is possible to determine the color of the pixel on the basis of a luminance of the object, light reflectance and light absorptance of the object's surface, and other factors.

The master node 32 divides the screen. For example, the screen may be divided into nine individual regions. Each of the plurality of drawing nodes 34 draws, by ray tracing, an image of the individual region taken charge of by itself. In ray tracing, the color of each pixel is determined by tracing the ray on a pixel-by-pixel basis of the screen. Therefore, ray tracing is suitable for distributed drawing because of the ease of dividing the screen. The display control node 36 generates a frame image by synthesizing together a plurality of individual images drawn by the plurality of drawing nodes 34 and displays the frame image on the display device 38. Although the reflectance, transparency, and refractive index of the object's surface and other factors can be elaborately reflected, the higher the screen resolution, the larger the amount of processing. In the present modification example, real-time drawing and display of a frame image is made possible by performing the drawing process with the plurality of drawing nodes 34 in a distributed manner through ray tracing. This modification example is particularly suitable in the case where real-time drawing and display of a VR video is required in games and so on.

However, all the drawing nodes 34 do not necessarily complete their drawing processes at the same time (or by a given timing). As a result, a delay in the drawing process of some of the drawing nodes 34 leads to delayed display of a frame image. For this reason, the display control node 36 suppresses, as much as possible, a delay in displaying the frame image as a whole by tolerating a drawing delay in surrounding regions as in the working example. Specifically, in the case where van individual image of a surrounding region is delayed, the image synthesis section 92 of the display control node 36 generates a frame image by using the individual image acquired from the drawing node 34 earlier. During display of a VR image on an HMD, in particular, users are not likely to feel a sense of discomfort even when a previous image is displayed in a surrounding region. Therefore, the technology of the present modification example is suitable for application to such a purpose.

A sixth modification example will be described. The display control node 36 may acquire or generate an individual image in a delayed region by applying a technology called reprojection or time warp. The display device 38 of the present modification example (here, an HMD) incorporates a variety of sensors (e.g., acceleration sensor, gyro sensor, attitude sensor) that are not depicted. The display control node 36 of the present modification example further includes an attitude detection section and an image generation section. The attitude detection section detects the attitude of the HMD (in other words, the user's head) on the basis of the signal output from the HMD's sensor. For example, the attitude detection section detects an orientation and angle of the HMD, a travel and speed of its motion, change in direction of line of sight, and so on. It should be noted that the HMD may include the above attitude detection section and send, to the display control node 36, data indicating the HMD attitude detected by the attitude detection section.

The image generation section can be said to be a reprojection section and can also be said to be an image conversion section. The image generation section predicts, for an individual image of a delayed region, a magnitude of deviation (referred to as a "variation") from an individual image acquired from the drawing node 34 earlier (referred to as a "reference image"). The image generation section generates the individual image of the delayed region by converting (e.g., performing an affine transform on) the reference image in accordance with the predicted variation. The reference image may be an immediately previous individual image displayed in the delayed region, an immediately previous individual image displayed in a surrounding region of the delayed region, or a combination of these individual images. The conversion of the reference image includes moving or tilting the image of the previous frame. For example, in the case where the leftward movement of the user's head by one individual region is detected, the image generation section may acquire, as an individual image of the delayed region, the immediately previous individual image of the first individual region on the left of the delayed region. Also, the image generation section may generate an individual image of the delayed region by changing the reference image such that the larger the change in HMD's attitude, the larger the change in the reference image.

The image synthesis section 92 of the display control node 36 generates a synthetic image by using the individual image generated by the image generation section as an individual image of the delayed region. The present modification example can provide the user with a synthetic image (frame image) that causes much lesser sense of discomfort because an image obtained by converting the previous individual image in response to the change in HMD's attitude is used as an individual image of the delayed region rather than using the previous individual image in an 'as-is' manner.

It should be noted that a reprojection process may be performed a plurality of times to display a single frame image. For example, in the case where an individual image of an individual region is delayed when it is time to draw a frame image, the image synthesis section 92 of the display control node 36 may generate a first frame image that includes an individual image of the delayed region generated by the above reprojection process. Here, in the case where there is a time lag from the generation of the frame image to the display thereof, a second frame image, obtained by converting the first frame image, may be generated by using the first frame image as a reference image on the basis of the HMD's attitude acquired by the detection section at a display timing. The frame image output section 94 of the display control node 36 may output the second frame image rather than the first frame image to the HMD for display. It should be noted that in the case where a frame rate is increased by reprojection, both the first frame image and the second frame image may be output to the HMD at their respective display timings for display.

In seventh and eighth modification examples, configurations for eliminating a delay in drawing an individual image will be described. As the seventh modification example, the screen division section 50 of the master node 32 may dynamically change the manner in which to divide the screen in accordance with conditions of a delay in drawing an individual image. For example, the drawing node 34 or the display control node 36 may notify, to the master node 32, information indicating the occurrence of a delay in drawing an individual image in the case where such a delay occurs (e.g., information indicating a delayed region and delay time). In the case where delay time exceeds a given threshold, the screen division section 50 of the master node 32 may dynamically change the manner in which to divide the screen so as to reduce the drawing load of the delayed region. Specifically, the screen division section 50 of the master node 32 may divide the delayed region into smaller parts than before, i.e., divide the delayed region into a plurality of individual regions. The individual region data delivery section 52 of the master node 32 may cause the plurality of drawing nodes 34, different from each other, to draw, in a distributed manner, images of the plurality of individual regions obtained by dividing the delayed region. This makes it easier to eliminate a delay in drawing the delayed regions.

It should be noted that the number of drawing nodes 34 for drawing individual images may be changed dynamically. For example, in the case where the number of divisions of the screen is increased, the number of drawing nodes 34, destinations to which to send individual region data (destinations to which to allocate data), may be increased to match the number of divisions. Also, the delay time threshold, a condition for dynamically changing the manner in which to divide the screen, may be set to different values depending on whether or not the delayed region is a region of interest. For example, the threshold may be set relatively short in the case where the delayed region is a region of interest, and the threshold may be set relatively long in the case where the delayed region is a surrounding region. As a result, in the case where there is a delay in drawing an individual image in a region of interest, the manner in which to divide the screen is likely to be changed even if the delay time is relatively short, making it likely that the drawing delay will be eliminated early.

As the eighth modification example, in the case where there is a delay in drawing an individual image, each of the plurality of drawing nodes 34 may reduce the quality of the individual image generated. For example, the drawing node 34 or the display control node 36 may notify, to the master node 32, information indicating the occurrence of a delay in drawing an individual image in the case where such a delay occurs (e.g., information indicating a delayed region and delay time). In the case where delay time exceeds a given threshold, the individual region data delivery section 52 of the master node 32 may send, to the drawing node 34 that takes charge of drawing a delayed image of the delayed region, data instructing that an individual image of lower quality than before be generated.

The drawing section 72 of the drawing node 34 that received the above instruction may generate an individual image of lower quality than before and increase the drawing process speed by simplifying the drawing process. For example, in the case where an individual image is generated by using point group data as individual region data, drawing processes related to some points of the individual region may be skipped. Also, in the case where an individual image is generated by ray tracing, the number of rays fired from the viewpoint to the pixels on the screen may be reduced as compared to before. Also, in the tracing of rays, the upper limit of the number of reflections on the object surface may be reduced as compared to before, and the number of parameters for calculating the reflectance and absorptance of rays on the object surface may be reduced as compared to before.

It should be noted that the delay time threshold, a condition for reducing the quality of individual images, may be set to different values depending on whether or not the delayed region is a region of interest. For example, the threshold may be set relatively long in the case where the delayed region is a region of interest, and the threshold may be set relatively short in the case where the delayed region is a surrounding region. This makes it easier to maintain the individual images in the region of interest at high quality and, at the same time, surrounding regions that is not likely to be noticed by users.

In the above working example, the screen division process, the drawing process (individual image generation process), and the synthesis process (frame image generation process) were performed by different apparatuses. However, there is no limit to the physical number of apparatuses as long as a configuration is used that performs the drawing process in parallel with a plurality of GPUs. For example, the screen division process, the drawing process, and the synthesis process may be performed by a single apparatus including a plurality of GPUs.

An arbitrary combination of the above working example and modification examples is also effective as an embodiment of the present invention. A new embodiment arising from the combination offers the advantageous effects of both the working example and the modification examples combined.

It should be understood by those skilled in the art that the function to be carried out by each constituent component recited in the claims is realized by one of the constituent elements depicted in the above working example and modification examples or by coordination therebetween.

REFERENCE SIGNS LIST

30 Image processing system, 32 Master node, 34 Drawing nodes, 36 Display control node, 38 Display device, 50 Screen division section, 72 Drawing section, 92 Image synthesis section, 94 Frame image output section.

INDUSTRIAL APPLICABILITY

The present invention is applicable to an image processing system.

The invention claimed is:

1. An image processing system comprising:
a plurality of drawing sections adapted to draw, in parallel, a plurality of individual images to be displayed in a plurality of individual regions obtained by dividing a frame display region;
an image synthesis section adapted to generate a synthetic image obtained by synthesizing together the plurality of individual images drawn by the plurality of drawing sections; and
a display control section adapted to cause the synthetic image to be displayed on a head-mounted display, wherein
in the case where the individual image of at least one individual region is delayed at a frame processing timing, the image synthesis section generates the synthetic image as an individual image of that individual region by applying the individual image of a previous frame.

2. The image processing system of claim 1, wherein
the image synthesis section generates the synthetic image by applying the individual image of the previous frame to the individual region whose individual image has been delayed and by applying the individual images of the current frame that arrived by the processing timing to other individual regions with no delay in their individual images.

3. The image processing system of claim 1, wherein
in the case where a length of time for which an individual image of an individual region is not available is less than a given time, the image synthesis section generates, as an individual image of the individual region, the synthetic image by applying the individual image of the previous frame.

4. The image processing system of claim 1, wherein
in the case where an individual region whose individual image is not available does not fall under a category of a given region of interest in which the user is likely to be keenly interested, the image synthesis section generates, as an individual image of the individual region, the synthetic image by applying the individual image of the previous frame.

5. The image processing system of claim 4, further comprising:
a division section adapted to divide the frame display region such that pixel counts of the individual regions that do not fall under the category of the region of interest are smaller than in the individual regions that fall under the category of the region of interest.

6. The image processing system of claim 1, further comprising:
a detection section adapted to detect an attitude of the head-mounted display; and
an image generation section adapted to generate an individual image of a delayed individual region by converting the individual image of the previous frame in accordance with the attitude of the head-mounted display detected by the detection section, wherein
the image synthesis section generates the synthetic image by using the individual image generated by the image generation section.

7. An image processing method causing a single computer or a plurality of computers to perform, in a distributed manner, the method comprising:
drawing, in parallel, a plurality of individual images to be displayed in a plurality of individual regions obtained by dividing a frame display region;

generating a synthetic image obtained by synthesizing together the plurality of individual images; and causing the synthetic image to be displayed on a head-mounted display, wherein in the case where the individual image of at least one individual region is delayed at a frame processing timing, the generating a synthetic image generates the synthetic image as an individual image of that individual region by applying the individual image of a previous frame.

8. A non-transitory computer readable medium having stored thereon a computer program for a computer, the program comprising:

by a plurality of drawing sections, drawing, in parallel, a plurality of individual images to be displayed in a plurality of individual regions obtained by dividing a frame display region;

by an image synthesis section, generating a synthetic image obtained by synthesizing together the plurality of individual images; and by a display control section, causing the synthetic image to be displayed on a head-mounted display, wherein in the case where the individual image of at least one individual region is delayed at a frame processing timing, the generating a synthetic image generates the synthetic image as an individual image of that individual region by applying the individual image of a previous frame.

* * * * *